US012440707B2

(12) United States Patent
Bugliosi et al.

(10) Patent No.: US 12,440,707 B2
(45) Date of Patent: Oct. 14, 2025

(54) REUSABLE RESPIRATOR

(71) Applicant: Milwaukee Electric Tool Corporation, Brookfield, WI (US)

(72) Inventors: Andrew T. Bugliosi, Milwaukee, WI (US); Trent T. Bauters, West Allis, WI (US); Aaron M. Williams, Milwaukee, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 848 days.

(21) Appl. No.: 17/703,547

(22) Filed: Mar. 24, 2022

(65) Prior Publication Data

US 2022/0288428 A1 Sep. 15, 2022

Related U.S. Application Data

(63) Continuation of application No. PCT/US2022/019534, filed on Mar. 9, 2022.

(Continued)

(51) Int. Cl.

*A62B 18/02* (2006.01)
*A62B 18/10* (2006.01)

(Continued)

(52) U.S. Cl.

CPC .............. *A62B 18/02* (2013.01); *A62B 18/10* (2013.01); *A62B 23/02* (2013.01); *B01D 46/2411* (2013.01)

(58) Field of Classification Search

CPC ....... A62B 18/00; A62B 18/02; A62B 18/025; A62B 18/04; A62B 18/08; A62B 18/082;

(Continued)

(56) References Cited

U.S. PATENT DOCUMENTS

| | | | |
|---|---|---|---|
| 1,845,460 | A | 2/1932 | Watters |
| 1,881,192 | A | 10/1932 | Hull |

(Continued)

FOREIGN PATENT DOCUMENTS

| | | |
|---|---|---|
| CN | 207253592 | 4/2018 |
| CN | 208260026 | 12/2018 |

(Continued)

OTHER PUBLICATIONS

International Search Report and Written Opinion for International Application No. PCT/US2022/019534, dated Jun. 23, 2022, 12 pages.

*Primary Examiner* — Colin W Stuart

(74) *Attorney, Agent, or Firm* — Reinhart Boerner Van Deuren s.c.

(57) ABSTRACT

Various reusable respirator designs are shown. In one example, a reusable respirator includes an inhalation pathway with a conduit extending from the exterior of the respirator into the nose piece allowing users to receive air directly into an inner sealed zone around a user's nose and mouth. The inhalation pathway includes a vent opening such that the inhalation pathway also directs air into a facemask zone, between the nose piece and an outer seal reducing/preventing shield fogging during inhalation. In another example, the respirator includes cartridge attachment lobes each having a different size and shape. A filter cartridge assembly can only be aligned with the lobes in one orientation, creating a robust connection. In another example, a storage bin for a reusable respirator includes a one-way film placed underneath a plurality of perforations allowing gases and moisture to escape the bin while limiting the ingress of other gases or particles.

16 Claims, 12 Drawing Sheets

Related U.S. Application Data

(60) Provisional application No. 63/159,034, filed on Mar. 10, 2021, provisional application No. 63/161,181, filed on Mar. 15, 2021.

(51) Int. Cl.
*A62B 23/02* (2006.01)
*B01D 46/24* (2006.01)

(58) Field of Classification Search
CPC ......... A62B 18/10; A62B 23/00; A62B 23/02; A62B 25/00; A62B 7/00; A62B 7/10; A62B 9/00; A62B 9/02
See application file for complete search history.

(56) References Cited

U.S. PATENT DOCUMENTS

| | | | | |
|---|---|---|---|---|
| 2,108,256 | A * | 2/1938 | Dym | A62B 18/00 128/201.15 |
| 2,684,066 | A * | 7/1954 | Glidden | A62B 9/02 128/201.15 |
| 2,810,386 | A | 10/1957 | Reed | |
| 4,402,316 | A | 9/1983 | Gadberry | |
| 4,595,003 | A * | 6/1986 | Shoemaker | A62B 18/02 128/206.17 |
| 4,676,236 | A | 6/1987 | Piorkowski et al. | |
| 4,764,990 | A | 8/1988 | Markert | |
| 4,850,346 | A | 7/1989 | Michel et al. | |
| 4,886,058 | A | 12/1989 | Brostrom et al. | |
| 4,934,361 | A | 6/1990 | Michel et al. | |
| 4,996,981 | A | 3/1991 | Elenewski | |
| 5,062,421 | A | 11/1991 | Burns et al. | |
| 5,181,507 | A | 1/1993 | Michel et al. | |
| 5,394,568 | A | 3/1995 | Brostrom et al. | |
| 5,419,450 | A * | 5/1995 | Guglielmelli | B65D 81/2015 220/255 |
| 5,481,763 | A | 1/1996 | Brostrom et al. | |
| 5,592,937 | A | 1/1997 | Freund | |
| 6,013,293 | A | 1/2000 | De Moor | |
| 6,176,239 | B1 * | 1/2001 | Grove | A62B 18/02 128/201.15 |
| 6,216,693 | B1 | 4/2001 | Rekow et al. | |
| 6,328,031 | B1 | 12/2001 | Tischer et al. | |
| 6,345,620 | B2 | 2/2002 | Salapow et al. | |
| 6,401,716 | B1 * | 6/2002 | Sword | A41D 13/1184 2/427 |
| 6,478,025 | B1 | 11/2002 | Tayco | |
| 6,578,572 | B2 | 6/2003 | Tischer et al. | |
| 6,701,925 | B1 | 3/2004 | Resnick | |
| 6,874,499 | B2 | 4/2005 | Viner et al. | |
| 6,920,880 | B1 | 7/2005 | Zahrt et al. | |
| 7,261,104 | B2 | 8/2007 | Kiefer et al. | |
| 7,464,705 | B2 | 12/2008 | Tanizawa et al. | |
| 7,497,217 | B2 | 3/2009 | Viner et al. | |
| 7,650,884 | B2 | 1/2010 | Flannigan et al. | |
| 8,225,782 | B2 | 7/2012 | Rakow et al. | |
| 8,336,543 | B2 | 12/2012 | Holmquist-Brown et al. | |
| 9,155,924 | B1 | 10/2015 | Grove et al. | |
| 9,393,448 | B2 | 7/2016 | Dwyer et al. | |
| 9,750,960 | B2 | 9/2017 | Fleming et al. | |
| 10,065,056 | B2 | 9/2018 | Flannigan et al. | |
| 10,363,441 | B2 | 7/2019 | Bergeron et al. | |
| 10,864,392 | B2 | 12/2020 | Thompson et al. | |
| 2005/0145249 | A1 | 7/2005 | Solyntjes et al. | |
| 2005/0268907 | A1 | 12/2005 | McFarlane | |
| 2006/0254592 | A1 | 11/2006 | Anders et al. | |
| 2010/0218761 | A1 | 9/2010 | Flannigan et al. | |
| 2010/0307506 | A1 | 12/2010 | Kielow et al. | |
| 2014/0261437 | A1 | 9/2014 | Catanzarite et al. | |
| 2015/0217146 | A1 | 8/2015 | Skov et al. | |
| 2015/0290478 | A1 | 10/2015 | Curran | |
| 2016/0243383 | A1 | 8/2016 | Yazdi et al. | |
| 2017/0021201 | A1 | 1/2017 | Baker et al. | |
| 2017/0021203 | A1 | 1/2017 | Baker et al. | |
| 2017/0274227 | A1 | 9/2017 | Fleming et al. | |
| 2018/0250536 | A1 | 9/2018 | Flannigan et al. | |
| 2018/0339178 | A1 | 11/2018 | Flannigan et al. | |

FOREIGN PATENT DOCUMENTS

| | | | | |
|---|---|---|---|---|
| CN | 209302052 | | 8/2019 | |
| CN | 111359113 | | 7/2020 | |
| CN | 211096844 | | 7/2020 | |
| CN | 111494821 | | 8/2020 | |
| CN | 111955819 | | 11/2020 | |
| CN | 212117177 | | 12/2020 | |
| CN | 212347486 | | 1/2021 | |
| DE | 2643853 | | 3/1978 | |
| DE | 20007705 | | 8/2000 | |
| DE | 202014001313 | | 2/2014 | |
| DE | 202020104424 | | 8/2020 | |
| DE | 202020104424 | U1 * | 9/2020 | A45C 11/00 |
| EP | 0363530 | A1 | 4/1990 | |
| EP | 0804261 | | 11/1997 | |
| EP | 2913084 | | 3/2019 | |
| KR | 10-1148973 | | 5/2012 | |
| KR | 10-1978807 | | 5/2019 | |
| WO | WO09038325 | | 3/2009 | |
| WO | WO2014/163772 | | 10/2014 | |
| WO | WO17196726 | | 11/2017 | |
| WO | WO18127939 | | 7/2018 | |
| WO | WO19063966 | | 4/2019 | |

* cited by examiner

REUSABLE RESPIRATOR

CROSS-REFERENCE TO RELATED PATENT APPLICATIONS

The present application is a continuation of International Application No. PCT/US2022/019534, filed on Mar. 9, 2022, which claims the benefit of and priority to U.S. Provisional Application No. 63/159,034, filed on Mar. 10, 2021, and to U.S. Provisional Application No. 63/161,181, filed on Mar. 15, 2021, which are incorporated herein by reference in their entireties.

BACKGROUND OF THE INVENTION

The present invention relates generally to the field of safety equipment. The present invention relates specifically to respirators for use in environments where toxic substances may be present and/or a storage system for respirators that allows noxious chemicals to escape from the stored respirator.

SUMMARY OF THE INVENTION

One embodiment of the invention relates to a reusable respirator including a face shield, a rim encompassing the face shield, and a nose piece. The nose piece creates a nose seal around a user's nose and mouth. The nose seal defines a breathing zone. The reusable respirator further includes a face seal and an inhalation pathway. The face seal together with rim and face shield create an outer seal on a user's face. A facemask zone is defined between the outer seal and the nose seal. The inhalation pathway includes a conduit. The conduit includes a first end rigidly coupled to the nose piece and a second end opposing the first end and including a filter cartridge engagement structure. The conduit further includes a sidewall extending between the first end and the second end, the sidewall having an outer surface and an inner surface. The conduit includes a channel and a vent, the channel defined by the inner surface of the sidewall, the channel extending through the conduit providing a direct pathway into the breathing zone. The vent is located through the sidewall at a location between the filter cartridge engagement structure and the first end of the conduit such that air from within the conduit is in communication with the facemask zone. The reusable respirator includes a filter cartridge assembly configured to couple to the filter cartridge engagement structure of the conduit and an exhalation pathway. The exhalation pathway includes an exhalation conduit coupled to the nose piece and a cover coupled to an outer end of the exhalation conduit.

Another embodiment of the invention relates to a respirator including a shield, a rim encompassing the shield, and a nose piece. The nose piece creates a nose seal around a user's nose and mouth. The reusable respirator further includes a face seal and an inhalation pathway. The face seal together with rim and the shield creates an outer seal on a user's face. A facemask zone is defined between the outer seal and the nose seal. The inhalation pathway includes a conduit. The conduit includes a first end rigidly coupled to the nose piece and a second end opposing the first end and including a filter cartridge engagement structure. The conduit further includes a sidewall extending between the first end and the second end, the sidewall having an outer surface and an inner surface. The conduit includes a channel and a vent, the channel defined by the inner surface of the sidewall, the channel extending through the conduit providing a direct pathway into the nose piece. The vent is located through the sidewall at a location between the filter cartridge engagement structure and the first end of the conduit such that the vent is outside of the nose piece. The reusable respirator includes a filter cartridge assembly configured to couple to the filter cartridge engagement structure of the conduit and an exhalation pathway. The exhalation pathway includes an exhalation conduit coupled to the nose piece and a cover coupled to an outer end of the exhalation conduit.

Another embodiment of the invention relates to a respirator storage device. The storage device including a base with a bottom wall including an inner surface and a sidewall extending upward from the bottom wall and including an inner sidewall surface. The inner surface of the bottom wall and the inner sidewall surface together define an interior chamber. The storage device further including a sealable lid coupled to the base. The lid includes an outward facing surface, an inward facing surface, a plurality of vent apertures extending between the outward facing and inward facing surfaces, and a polymer film. The polymer film is located along the inward facing surface below the plurality of vent apertures. The polymer film allows gases released from a respirator to escape through the plurality of vent apertures.

One embodiment of the invention relates to a reusable respirator including a rim that encompasses a shield that together with a face seal creates an outer seal on a user's face. The reusable respirator further includes a noise piece that creates a nose seal around a user's nose and mouth such that a breathing zone is defined around the user's mouth and nose by the nose seal, and a facemask zone is defined between the nose seal and the outer seal. The reusable respirator includes an inhalation pathway including a conduit extending from an exterior of the respirator into the nose piece. The inhalation pathway includes a primary inhalation valve. The reusable respirator includes an exhalation pathway with a cover rigidly coupled to an outer end of the exhalation pathway. The inhalation pathway includes an attachment structure at an outer end of the inhalation pathway configured to attach a filter cartridge assembly. The primary inhalation pathway includes a vent opening located between the cartridge connection and the nose piece such that inhalation pathway is in fluid communication with the facemask zone. In this manner the inhalation pathway creates a dual air inflow pathway that delivers filtered air to both the breathing zone and the facemask zone. In some embodiments, the nose piece includes a secondary inhalation valve creating a secondary pathway for filtered air into the nose piece from the facemask zone that is opened when a user breathes in. In some such embodiments, an inhalation valve is located along the primary inhalation pathway adjacent the nose piece, and in this embodiment, the vent opening is located between the cartridge connection and the inhalation valve.

Another embodiment of the invention relates to a respirator with a plurality of cartridge attachment lobes each having a different size and/or shape from the other lobes. These lobes are located around the outer end of the inhalation pathway and are shaped and positioned to couple to a cooperating mating structure of a filter cartridge. Each lobe has a different radial dimension and a different width dimension as compared to the other lobes. When a user attaches a cartridge to the respirator the lobe dimensions mean the cartridge can only be aligned in a single orientation, creating a more robust connection between the cartridges and the outer end of the inhalation pathway. In one embodiment, the respirator is a full-mask respirator with a shield or lens defining a facemask zone, and in another embodiment, the respirator is a half-mask respirator with no shield.

Another embodiment of the invention relates to a storage system for a reusable respirator. A storage bin large enough to contain a respirator includes a sealable lid with a one-way film placed inside the lid underneath a plurality of perforations. The one-way film acts as a valve allowing gases and/or liquids to escape the bin while limiting the ingress of dust, air, chemicals, liquids, etc. into the bin. It should be understood that, in various embodiments, the storage bin can fit a full-mask respirator or a half-mask respirator along with cartridges and additional accessories (e.g., safety glasses).

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
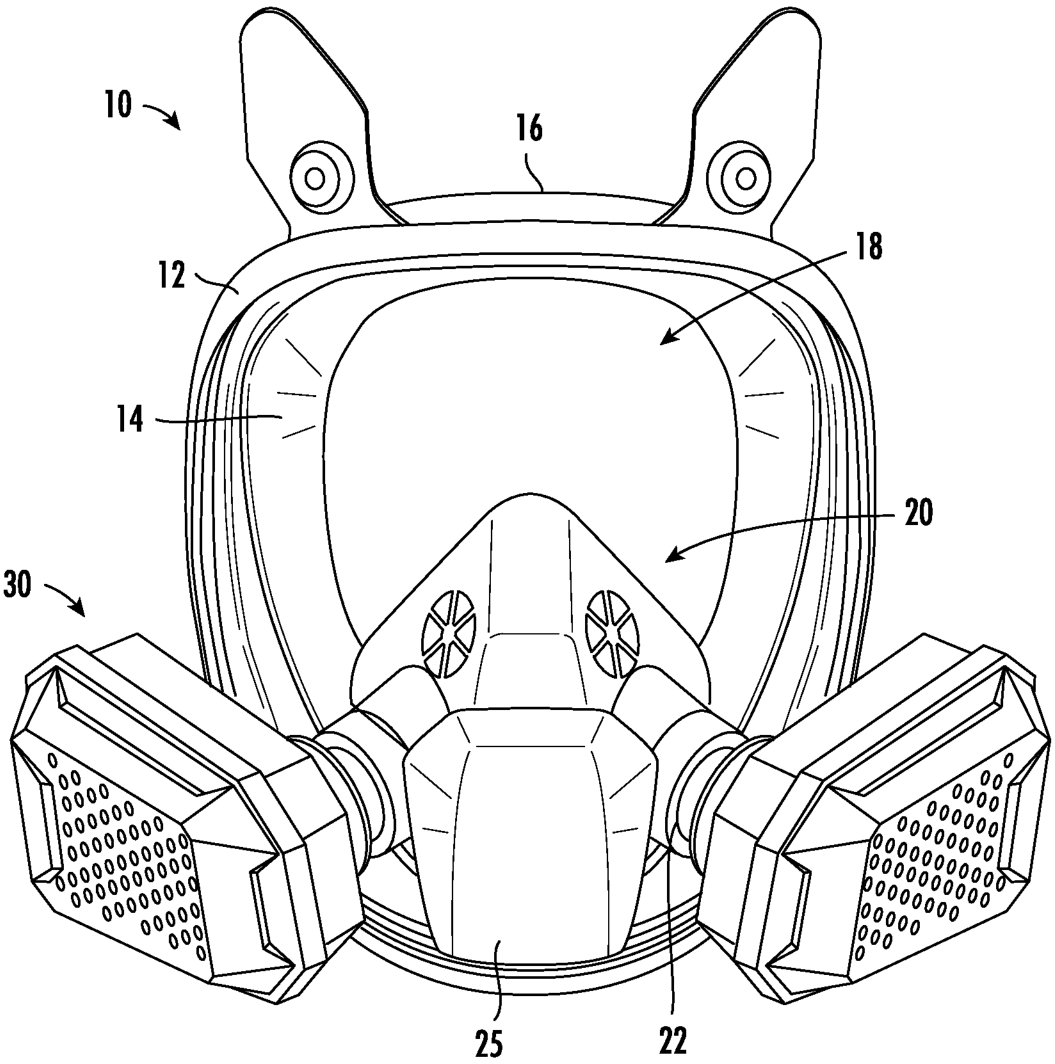
FIG. 1 is a front view of a full-mask respirator, according to an exemplary embodiment.

Referring generally to the figures, various embodiments of a reusable respirator, and a storage bin for a respirator are shown. As discussed herein, Applicant has developed a number of improvements to the functionality of reusable respirators. In one embodiment, an inhalation pathway includes a conduit extending from an exterior of the respirator into the nose piece. The conduit provides a direct pathway for filtered air into the inner sealed zone surrounding a user's nose and mouth, shown as a breathing zone. The direct pathway into the breathing zone provides reduced breathing resistance for users. The inhalation pathway includes a vent opening located between the cartridge connection and the nose piece creating a direct pathway for the filtered air into the facemask zone. Fresh air continuously flows through the vent into the facemask zone, between the face seal and the nose piece. A secondary inhalation valve located on the side of the nose piece provides a secondary pathway for filtered air into the breathing zone from the facemask zone when the user breaths in. When the user breathes out, exhaled air exits directly from the nose piece through an exhalation valve. These dual inhalation pathways allow a majority of air to flow into the breathing zone, while providing continuous fresh air to the facemask zone preventing the face shield from fogging up because of accumulated moisture (e.g. sweat).

In another embodiment, the reusable respirator contains a plurality of cartridge attachment lobes each having a different size and/or shape from the other lobes. These cartridge attachment lobes couple to a cooperating mating structure of a filter cartridge assembly that includes a filtering system. In other embodiments, the filter cartridge assembly may be a tube (e.g. PAPR, SCBA, etc.). Air flows through the filtering system into the inhalation pathway. Each lobe has a different radial dimension and a different width dimension as compared to the other lobes. When a user attaches a cartridge to the respirator the lobe dimensions mean the filter cartridge assembly can only be aligned in a single orientation, creating a more robust connection between the cartridges and the outer end of the inhalation pathway. This lobe design creates a more intuitive cartridge installation process and prevents against the possibility of a forced connection between the cartridge and the inhalation pathway ensuring proper air filtration for the mask user. It should be understood that the cartridge attachment lobes could similarly be located on the filter cartridge with a cooperating mating structure positioned on the inhalation pathway.

In another embodiment, an improved storage system for a respirator is shown. A storage bin large enough to contain the respirator, cartridges, and accessories includes a sealable lid. The sealable lid includes perforations with a one way film placed inside the lid underneath the perforations. The combination of perforations and film allow odors, noxious chemicals, and moisture to escape the bin while the respirator is stored. The nature of the one way film prevents dust, chemicals or liquids from traveling through the perforations into the storage bin. This storage system allows users to vent their protective equipment between uses reducing the likelihood that noxious chemicals, liquids, or odors from a previous exposure will remain on the respirator for subsequent uses. In a specific embodiment, the storage bin includes an organizational component (e.g. a tray) that separates the respirator mask, cartridges, and accessories.

Figure 2:
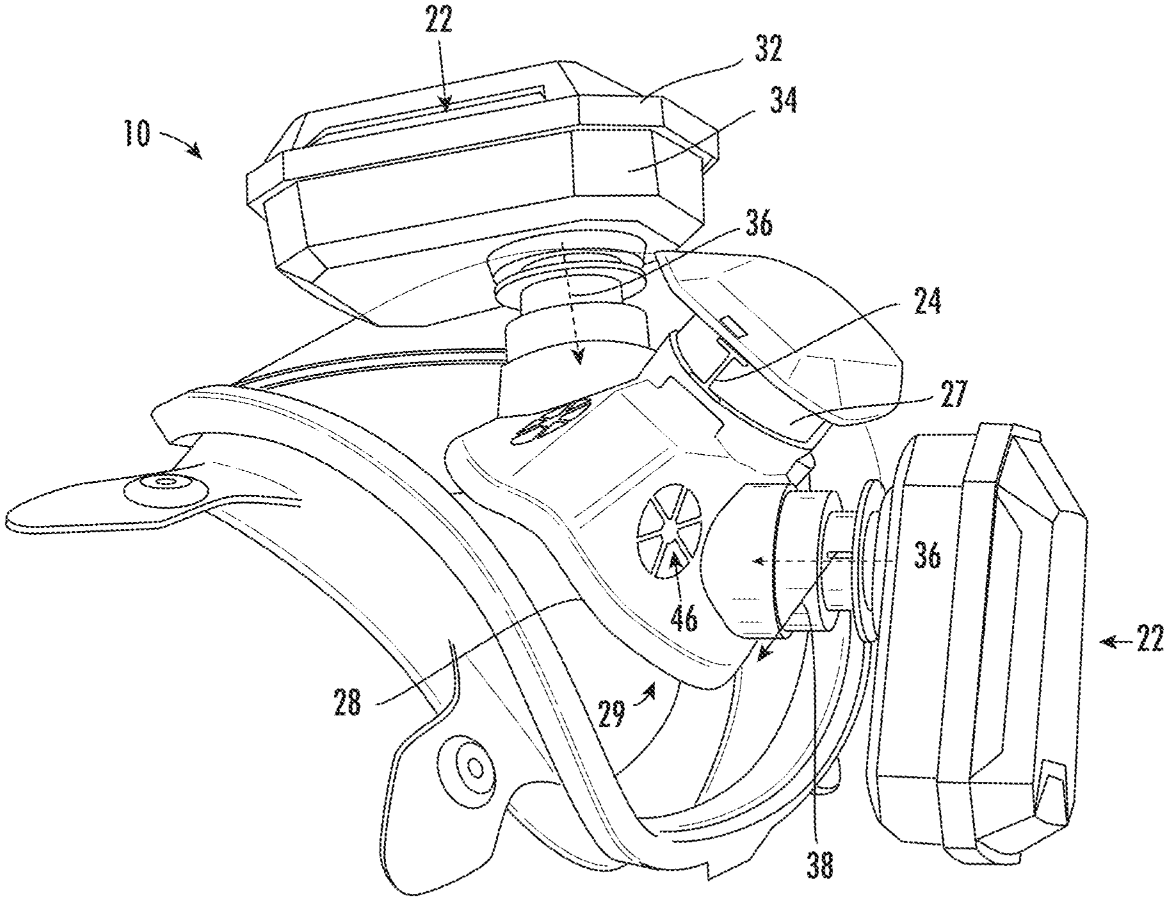
FIG. 2 is a top perspective view of the full-mask respirator of FIG. 1, according to an exemplary embodiment.
Figure 3:
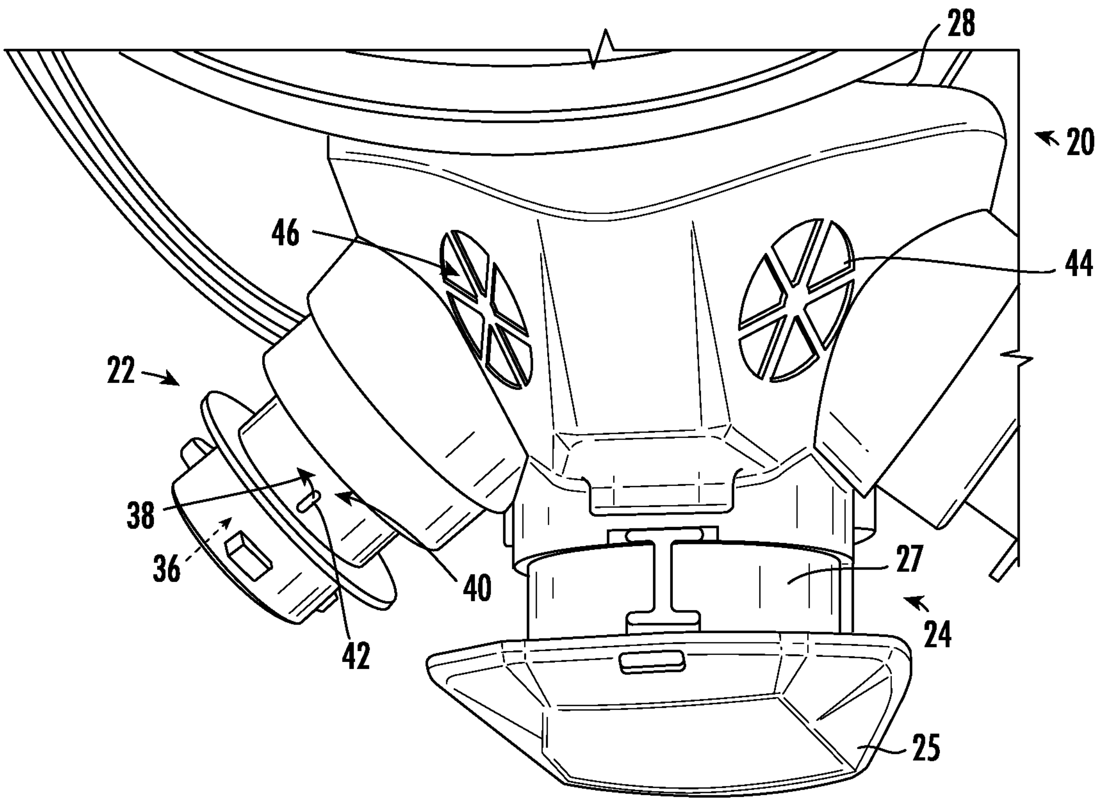
FIG. 3 is a detailed perspective view of the nose piece and the inhalation pathways of the full-mask respirator of FIG. 1 with a shield removed, according to an exemplary embodiment.

Referring to FIGS. 1-2, various aspects of a reusable respirator, shown as a full-face respirator 10, are shown. Respirator 10 includes a rim 12 that encompasses a shield, shown as face shield 14 that together with face seal 16 creates an outer seal on a user's face defining a facemask zone 18. Shield 14 is formed from a material that allows a user to view their surrounding area (e.g., transparent, translucent, etc.). Respirator 10 further includes a nose piece 20, at least one inhalation pathway, shown as a pair of primary inhalation pathways 22, an exhalation pathway 24 including an exhalation conduit 27 coupled to an exhalation valve cover 25, and a filter cartridge assembly 30 coupled to primary inhalation pathways 22. Filter cartridge assembly 30 includes a top cover 32, a lower cover 34, and various filtering components (e.g., pleated filter, carbon layer, non-woven fabric layer). As discussed in more detail below, inhalation pathways 22 each include a valve that opens during inhalation, and exhalation pathway 24 includes a valve that opens during exhalation. Referring to FIGS. 2-3, respirator 10 further includes a nose seal 28 that creates an inner sealed zone around a user's nose and mouth, defining a breathing zone 29. Primary inhalation pathways 22 provide a direct pathway for filtered air into breathing zone 29 as shown by arrow 36. Inhalation pathways 22 are rigidly coupled to nose piece 20 on either side of the exhalation pathway 24. Inhalation pathways 22 each contain a vent, shown as slit 40, defined by a continuous edge 42. Slit 40 creates a divided pathway for the filtered air as shown by arrow 38. Fresh air continuously flows (e.g., in fluid communication) through slit 40 into the facemask zone 18 reducing/preventing shield 14 fogging during inhalation by providing fresh, filtered air into facemask zone 18. In a specific embodiment, the inhalation pathways 22 direct air into the breathing zone 29 while providing at least some air into the facemask zone 18 such that the shield 14 is prevented from fogging up when an operator inhales.

A pair of secondary inhalation valves 44 located on the side of nose piece 20 generally above primary inhalation pathways 22, provide a second pathway for filtered air into the breathing zone 29 shown by arrow 46 when a user breathes in or inhales. When a user breathes out or exhales, exhaled air moves directly from the nose piece 20 through exhalation pathway 24 and specifically through the exhalation conduit 27. Exhalation conduit 27 is coupled to and at least partially received within a front portion of nose piece 20. In a specific embodiment, exhalation conduit 27 is positioned between a pair of primary inhalation pathways 22 (e.g., in the middle or centrally positioned). Exhalation conduit 27 further includes a valve (e.g., a diaphragm) positioned within the exhalation conduit 27 and behind (in the orientation shown in FIG. 3) the exhalation valve cover 25. The pathways for air flow through respirator 10 are shown fully in FIG. 2.

Figure 4:
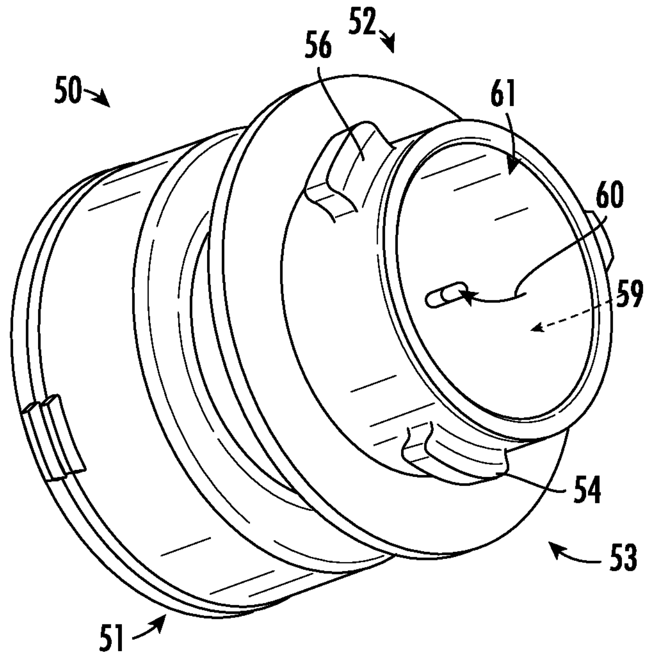
FIG. 4 is a right side perspective view of the inhalation pathway of the full-mask respirator of FIG. 1, according to an exemplary embodiment.
Figure 5:
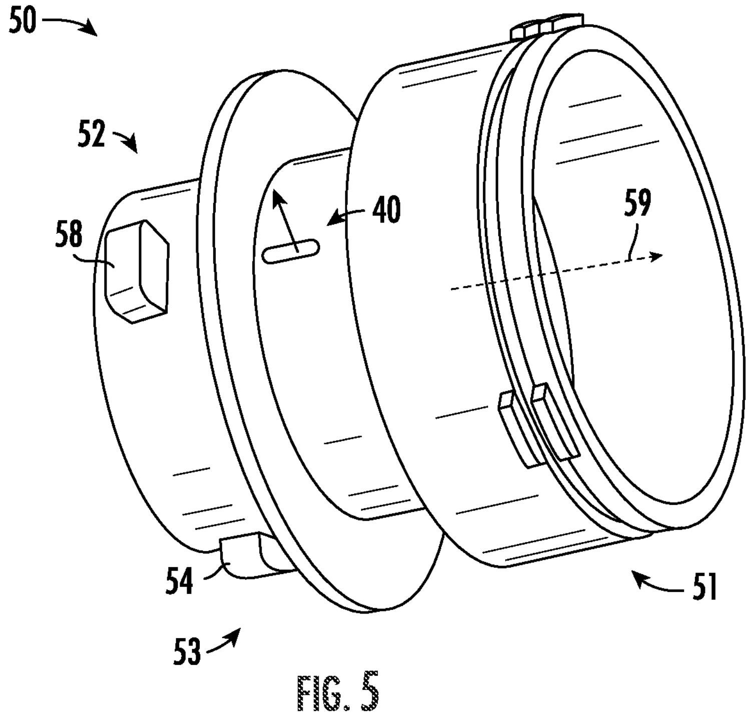
FIG. 5 is a left side perspective view of the inhalation pathway of the full-mask respirator of FIG. 1, according to an exemplary embodiment.

Referring to FIGS. 4-9, various aspects of the filter cartridge attachment structure of respirator 10 are shown according to exemplary embodiments. Referring to FIGS. 4-5, details of primary inhalation pathway 22 are shown. Inhalation pathway 22 is formed from a conduit 50 having a first or inner end 51 coupled to and at least partially received within nose piece 20 and a second or outer end 53 with a filter cartridge engagement structure 52. Conduit 50 includes a sidewall extending between first end 51 and second end 53, the sidewall includes an outer surface and an inner surface 78. Slit 40 is located through the sidewall of conduit 50 between filter cartridge engagement structure 52 and first end 51 of conduit 50. Filter cartridge engagement structure 52 includes a first cartridge attachment lobe 54, a second cartridge attachment lobe 56, and a third cartridge attachment lobe 58 that allow for coupling to cartridge lower cover 34. An arrow 59 shows the primary pathway for fresh air to directly reach nose piece 20 and breathing zone 29 and arrow 60 shows the direct pathway for fresh air to reach the facemask zone 18.

Figure 6:
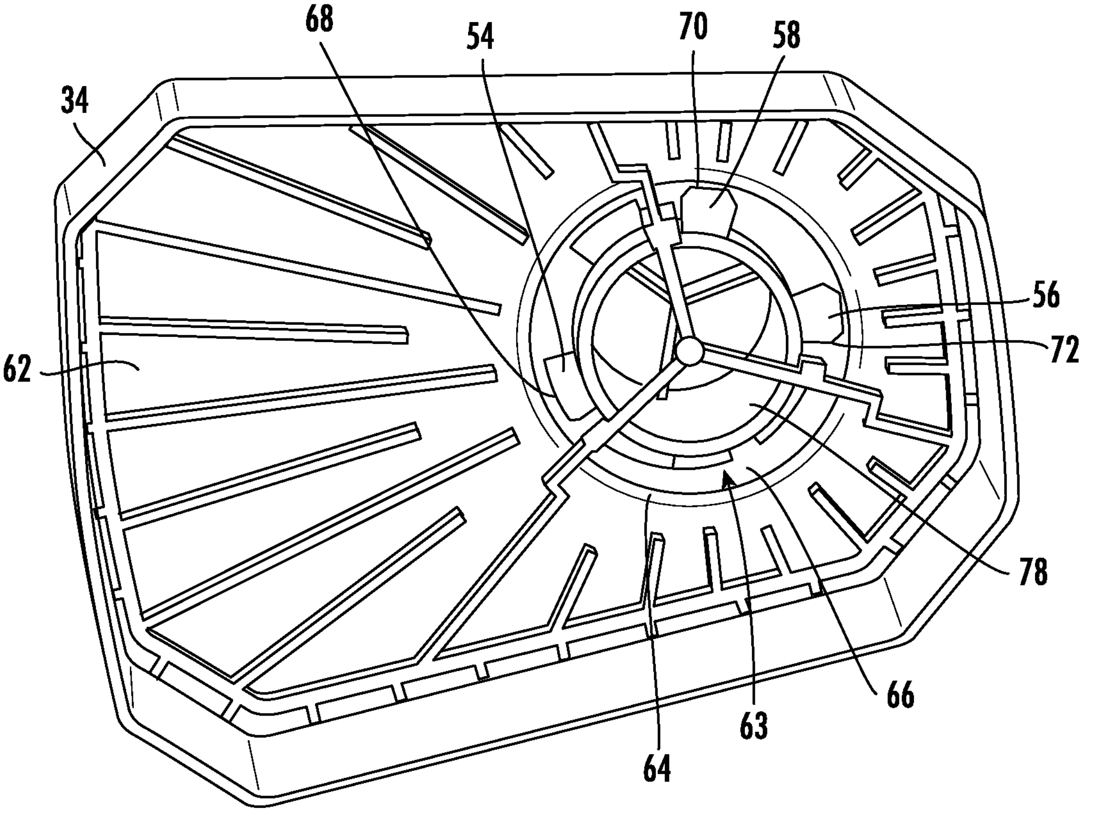
FIG. 6 is a detailed perspective view of the cartridge attachment structure coupled to the cooperating mating structure of the filter cartridge, according to an exemplary embodiment.

Referring to FIG. 6, the only orientation that cartridge attachment lobes 54, 56, 58 correctly fit with lower cover 34 is shown. Lower cover 34 contains a bottom inner surface 62 with a generally circular recess 63 defined by an edge 64. Generally circular recess 63 includes a lowered surface 66. Lowered surface 66 includes a first cutout 68 that matches the dimensions of cartridge attachment lobe 54. A second cutout 72 of lower surface 66 matches the dimensions of cartridge attachment lobe 56 and a third cutout 70 matches the dimensions of cartridge attachment lobe 58. The different sizes and shapes of cartridge attachment lobes 54, 56, 58 result in a single orientation that filter cartridge assembly 30 and more specifically lower cover 34 rigidly couples to filter cartridge engagement structure 52.

Figure 7:
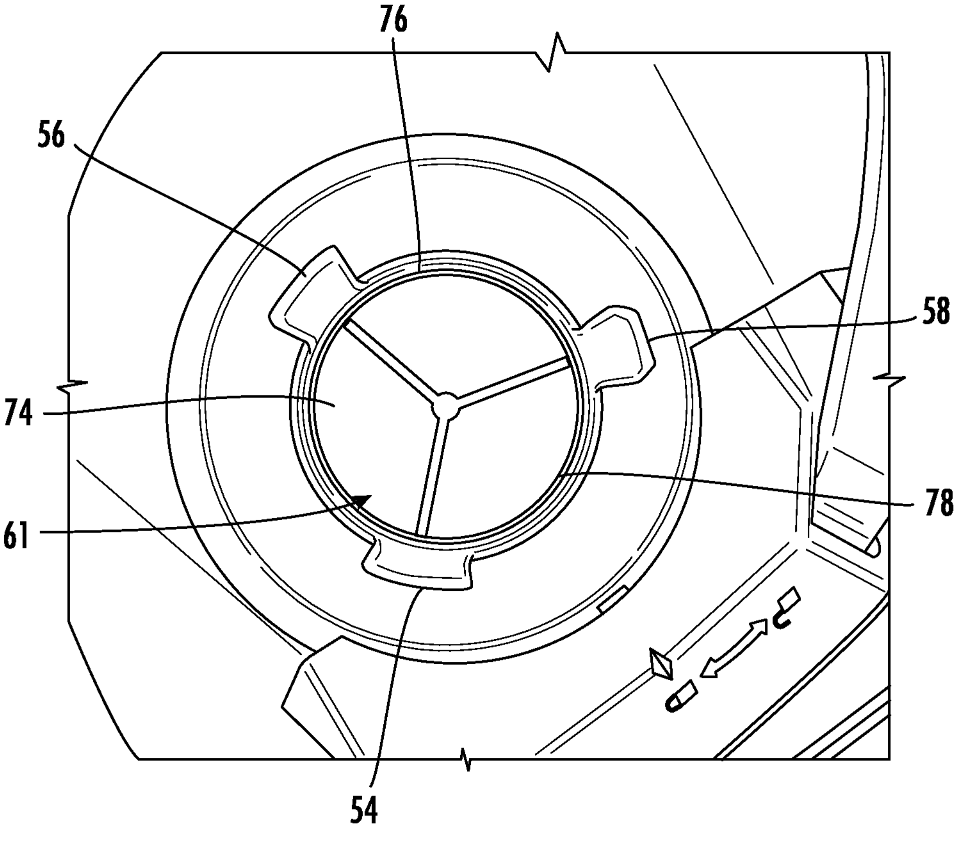
FIG. 7 is a plan view of the cartridge attachment structure, according to an exemplary embodiment.
Figure 8:
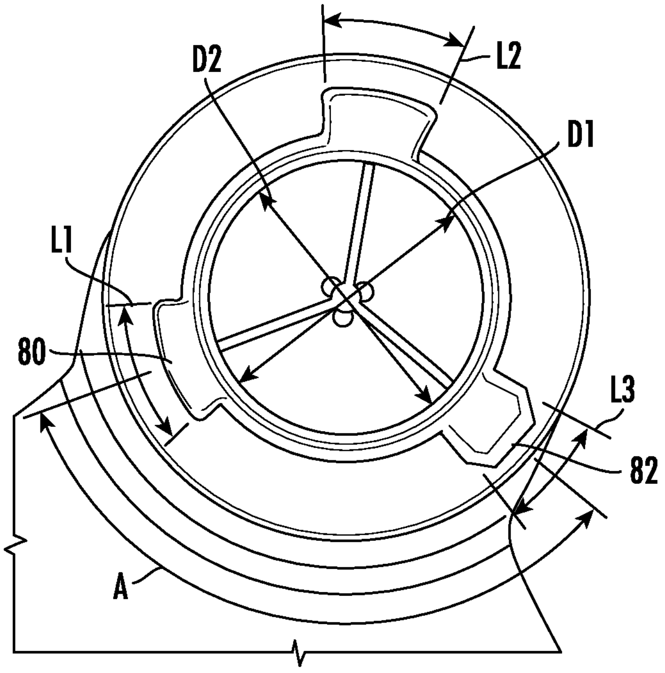
FIG. 8 is a detailed plan view of the attachment lobes of the primary inhalation pathway, according to an exemplary embodiment.

Referring to FIGS. 7-8, a plan view of filter cartridge engagement structure 52 is shown. Primary inhalation pathway 22 further includes a valve, shown as a diaphragm 74. Diaphragm 74 has an outer edge 76 defined by the inner surface 78 of conduit 50. Inner surface 78 is defined by an inner diameter D1. Conduit 50 further includes an outer diameter D2. Diaphragm 74 acts to seal a channel 61 of primary inhalation pathway 22. Channel 61 is defined by inner surface 78 of the sidewall of conduit 50. In various embodiments D1 is between 79% and 99% of D2, specifically between 84% and 94% of D2 and more specifically between 86% and 92% of D2. In a specific embodiment, D1 is between 88% and 90% of D2 and in such embodiments, D2 is about 26 millimeters (e.g., 26 millimeters plus or minus 2 millimeters).

Figure 9:
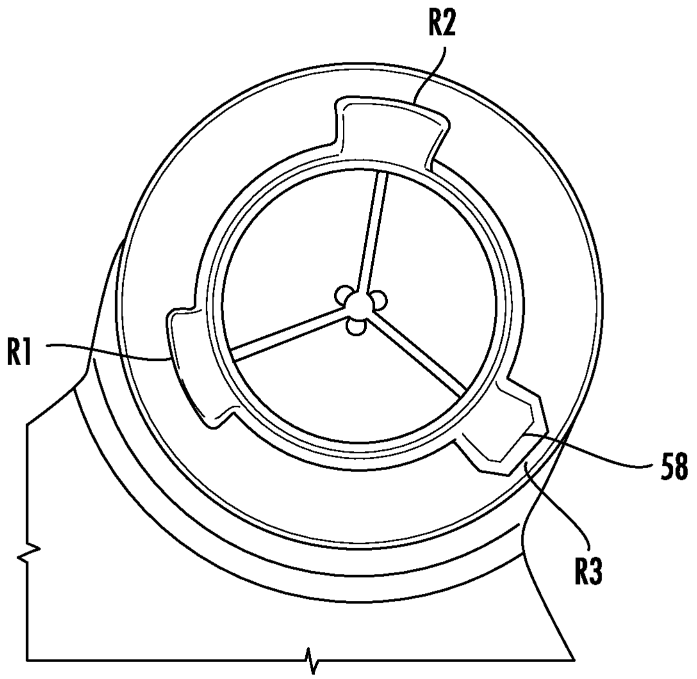
FIG. 9 is a detailed plan view of the attachment lobes of the primary inhalation pathway, according to an exemplary embodiment.

Referring to FIGS. 8-9 and as noted above, each cartridge attachment lobe 54, 56, 58 has a unique size and shape that Applicant has determined provides a high level of seal engagement as well as provides for easy alignment and permits attachment of the filter cartridge only in the proper orientation. Each cartridge attachment lobe 54, 56, 58 includes an outermost edge defined by a radius R1, R2, R3 and an arc length L2, L2, L3. In various embodiments, L3 is between 50% and 75% of L1, specifically between 60% and 70% of L1 and more specifically between 65% and 70% of L1. In a specific embodiment, L3 is specifically between 65% and 67% of L1 and in such embodiments, L1 is about 36 millimeters (e.g., 36 millimeters plus or minus 2 millimeters). In various embodiments, L3 is between 50% and 90% of L2, specifically between 60% and 90% of L2 and more specifically between 70% and 90% of L2. In a specific embodiment, L3 is between 75% and 85% of L2 and specifically between 79% and 81% of L2, and in such embodiments, L2 is about 30 millimeters (e.g. 30 millimeters plus or minus 2 millimeters). In a specific embodiment, the distance between a center point 80 of arc length L1 and a center point 82 of arc length L3 is defined by an angle, shown as central angle A which is 120°. As shown in FIG. 9, cartridge attachment lobe 58 is chamfered. In a specific embodiment, attachment lobe 58 has a chamfer with the dimensions shown in FIG. 9. The chamfer structure provides an additional indicator for alignment between the cartridge attachment lobes and the filter cartridge.

In various embodiments, R1 is between 50% and 99% of R2, specifically between 65% and 99% of R2 more specifically between 70% and 95% of R2. In a specific embodiment, R1 is between 90% and 99% of R2 and specifically is between 91% and 93% of R2, and in such embodiments, R2 is about 17 millimeters (e.g., 17 millimeters plus or minus 2 millimeters). In various embodiments, R2 is between 50% and 99% of R3, specifically between 65% and 99% of R3 and more specifically between 70% and 95% of R3. In a specific embodiment, R2 is between 90% and 99% of R3 and specifically is between 92% and 94% of R3, and in such embodiments, R3 is about 18 millimeters (e.g., 18 millimeters plus or minus 2 millimeters).

Figure 10:
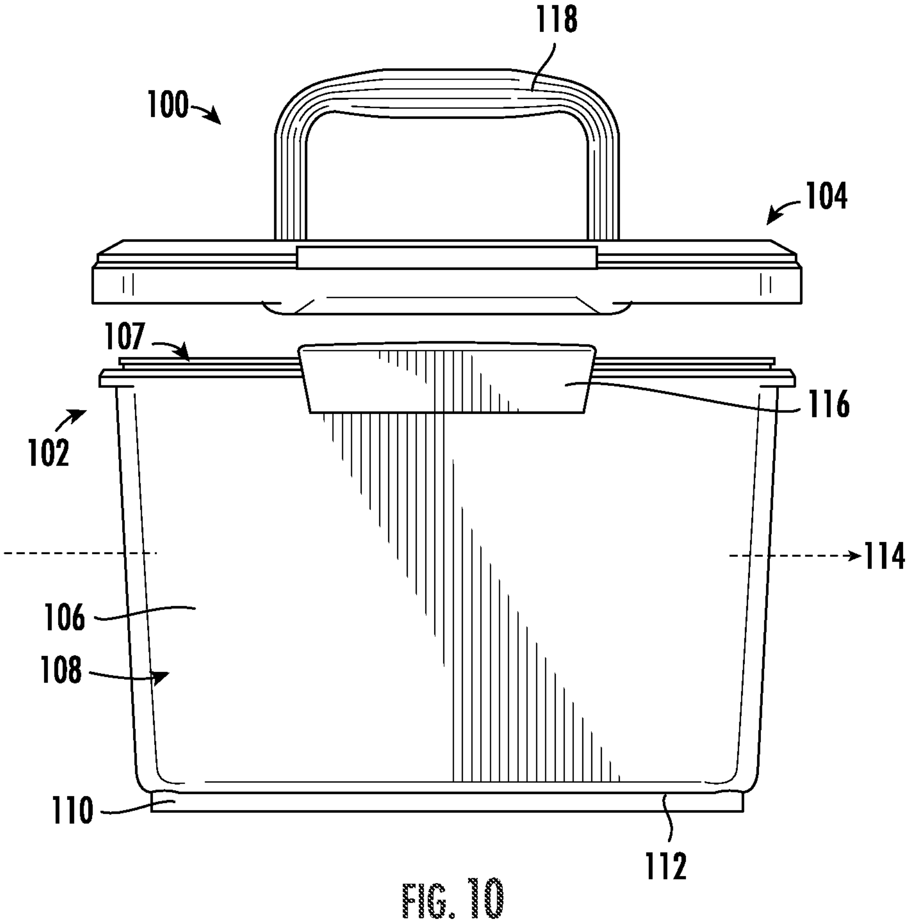
FIG. 10 is a front view of a storage bin for a reusable respirator, according to an exemplary embodiment.
Figure 11:
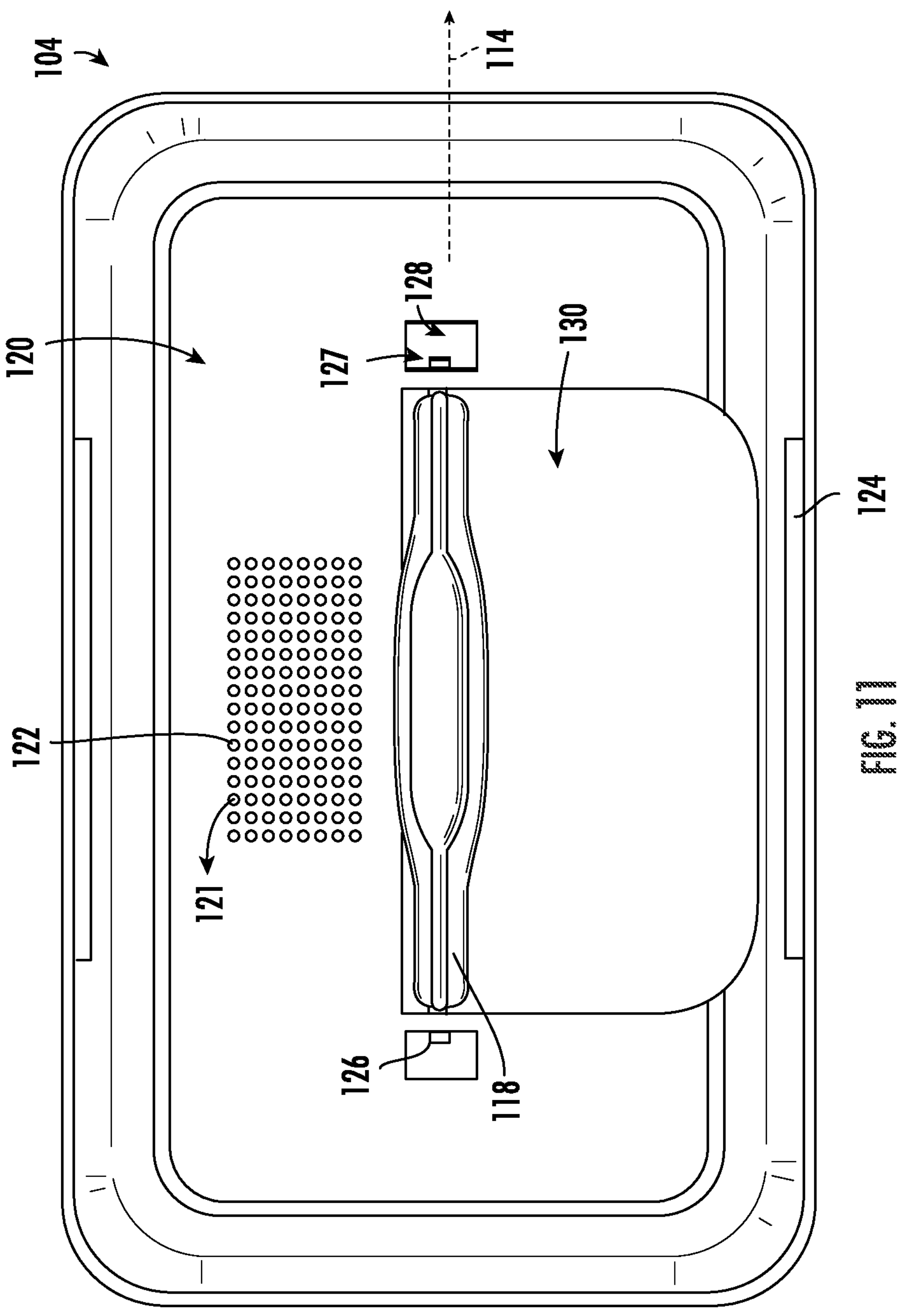
FIG. 11 is a top view of the storage bin of FIG. 10, according to an exemplary embodiment.
Figure 12:
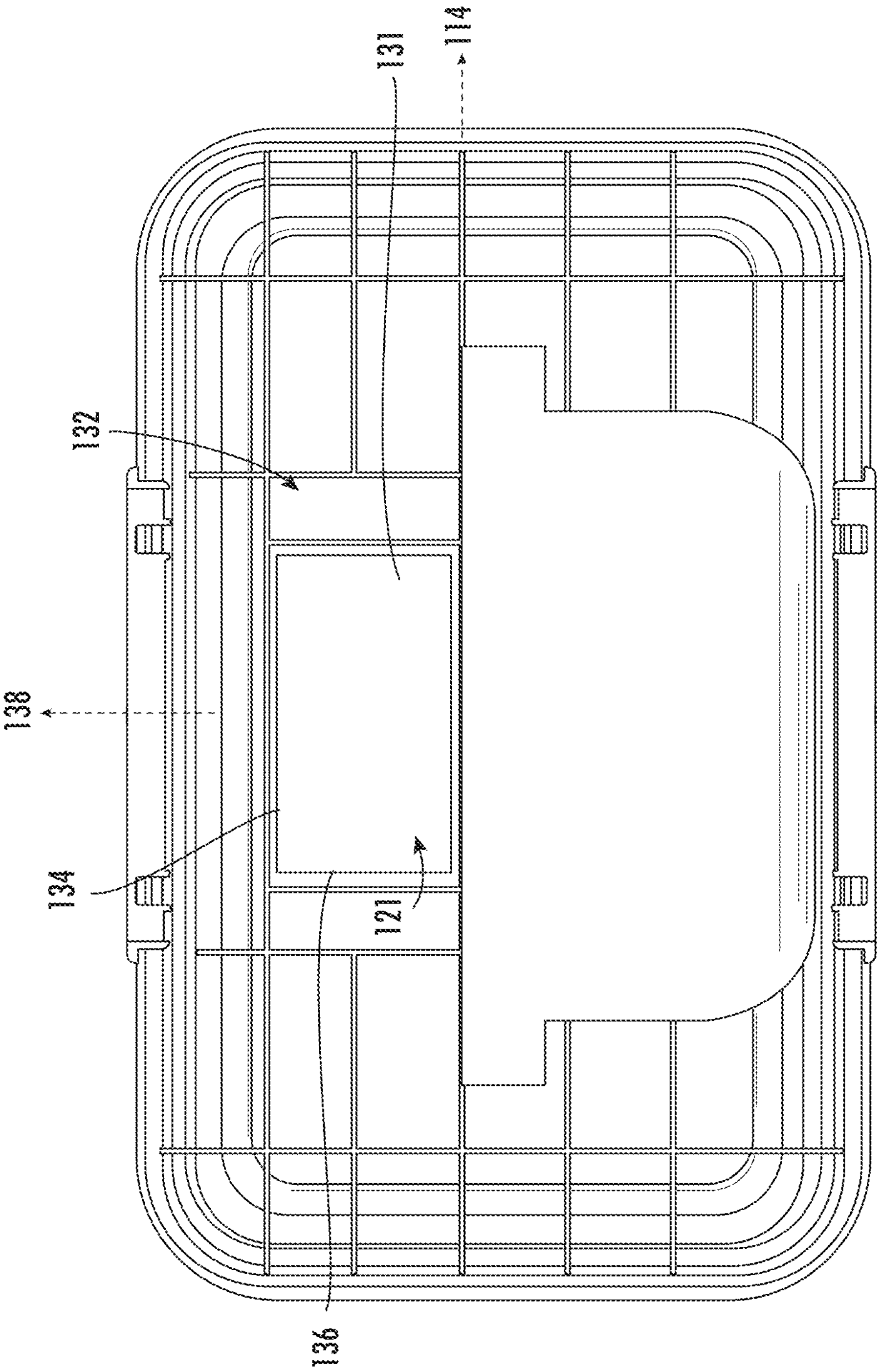
FIG. 12 is a bottom view of a storage bin lid including a polymer layer, according to an exemplary embodiment.

Referring to FIGS. 10-12, a respirator storage system or device, shown as a bin 100, is shown according to an exemplary embodiment. Bin 100 includes a base 102 and a lid 104. Base 102 includes a bottom wall 112 and a sidewall 106 extending upward from bottom wall 112. Together bottom wall 112 and sidewall 106 have inner surfaces that define an interior contents chamber 107. Bottom wall 112 and sidewall 106 also include an outer surface 108 defining the exterior surface of bin 100, a bottom lip 110 that depends downward from bottom wall 112 of base 102, and a pair of clips 116. Clips 116 are coupled to the portions of the sidewall 106 generally parallel to a major axis 114. Lid 104 is coupled to a handle 118.

Referring to FIG. 11, various aspects of lid 104 are shown. Lid 104 includes an upward facing, generally horizontal surface 120 (e.g., generally perpendicular to sidewall 106 or 90°±10°) with a plurality of vent apertures, shown as square apertures 122. The square apertures 122 extend through the upward facing, generally horizontal surface 120 of lid 104 such that the interior contents chamber 107 is in communication with outside air. In the embodiment, shown apertures 122 are arranged in a rectangular grid pattern with a major axis oriented generally parallel to major axis 114 of bin 100. An arrow 121 indicates the direction of movement of potentially noxious chemicals out of storage bin 100. Lid 104 further includes clip indentions 124 parallel to longitudinal axis 114 allowing clips 116 to lock lid 104 onto base 102. It should be understood that the vent apertures and filtering system could similarly be located on any of the other surfaces of the bin.

Handle 118 includes a pair of projections 126 that extend into handle connection recesses 128 through a pair of apertures 127, facing in the direction of major axis 114 coupling handles 118 to lid 104. FIG. 11 shows handle 118 in both a vertical position and a horizontal position when handle 118 is folded into a handle recess 130. Handle recess 130 is positioned between handle connection recesses 128 in an orientation generally parallel to major axis 114 of bin 100.

Referring to FIG. 12, various aspects of the filtering mechanism of bin 100 are shown. Again, the arrow 121 indicates the direction of movement of potential toxins and/or moisture out of storage bin 100. These toxins escape through a one-way vent structure, shown as a one-way polymer film 131. Polymer film 131 allows gases released from a respirator, such as respirator 10 or half-mask respirator 200 to escape through the plurality of vent apertures 122.

In the specific embodiment shown, polymer film 131 has a generally rectangular shape and is placed on the downward facing, horizontal surface 132 of lid 104 below the plurality of square apertures 122. In other embodiments, the polymer film may have another shape (e.g. polygonal, circular, oval, etc.). Polymer film 131 is oriented so that a first edge 134 is generally parallel to major axis 114 and a second edge 136 is generally parallel to a minor axis 138. In a specific embodiment, the film is formed from polytetrafluoroethylene (PTFE). In other embodiments the polymer film may be formed of polypropylene (PP), polyethylene (PE), polyvinyl chloride (PVC), cellulose or other polymers with hydrophobic properties.

Figure 13:
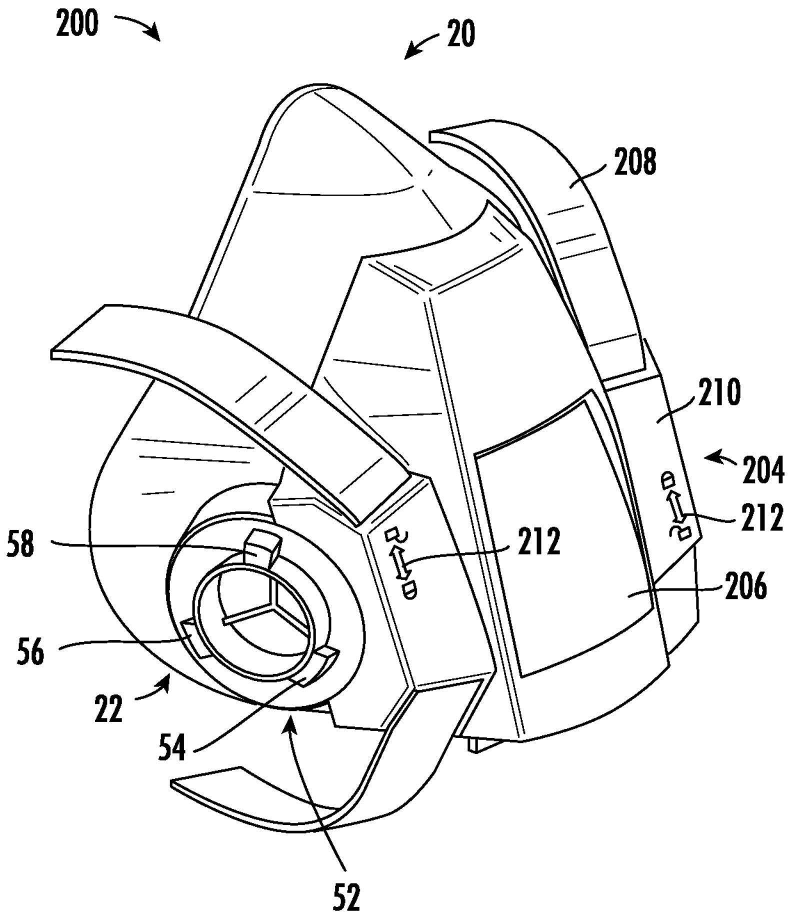
FIG. 13 is right side perspective view of a half-mask respirator, according to an exemplary embodiment.

Referring to FIG. 13, various aspects of a reusable respirator, shown as a half-mask respirator 200, are shown. In general respirator 200 is substantially the same as respirator 10 except for the differences discussed herein. In particular, respirator 200 includes filter cartridge engagement structure 52 with attachment lobes 54, 56 and 58 as discussed above. However, unlike the full-mask style respirator 10, respirator 200 does not include a face shield and the related components that create a facemask zone. Similarly, primary inhalation pathways 22 do not have vent openings and therefore there are not dual airflow pathways. In addition, nose piece 20 of hall-mask respirator 200 also does not include secondary inhalation valves.

Respirator 200 includes a yoke 204 coupled to noise piece 20. Yoke 204 includes a central cover 206 rigidly coupled to an outer end of the exhalation pathway such that it is positioned to cover the exhalation pathway. Respirator 200 further includes straps 208 positioned on either side of the exhalation pathway and central cover 206. Straps 208 are held to respirator 200 by being pinched between yoke 204 and side covers 210, positioned on either side of central cover 206. Side covers 210 include an indicator, shown as locking indicator 212 for straps 208. Locking indicator 212 may be applied through a sticker or laser etching.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed:

1. A respirator comprising:
- a face shield;
- a rim encompassing the face shield;
- a nose piece, the nose piece is configured to create a nose seal around a user's nose and mouth, the nose seal defining a breathing zone;
- a face seal, the face seal together with the rim and the face shield is configured to create an outer seal on a user's face, wherein a facemask zone is defined between the outer seal and the nose seal;
- an inhalation pathway, the inhalation pathway comprising:
  - a conduit comprising:
    - a first end rigidly coupled to the nose piece;
    - a second end opposing the first end and including a filter cartridge engagement structure;
    - a sidewall extending between the first end and the second end, the sidewall having an outer surface and an inner surface;
    - a channel defined by the inner surface of the sidewall, the channel extending through the conduit providing a direct pathway into the breathing zone; and
    - a vent located through the sidewall at a location between the filter cartridge engagement structure and the first end of the conduit such that air from within the conduit is in communication with the facemask zone;
- a filter cartridge assembly configured to couple to the filter cartridge engagement structure of the conduit; and
- an exhalation pathway, the exhalation pathway comprising:
  - an exhalation conduit coupled to the nose piece; and
  - a cover coupled to an outer end of the exhalation conduit.

2. The respirator of claim 1, wherein the inhalation pathway directs air into the breathing zone while providing at least some air from the conduit into the facemask zone through the vent such that condensation on the face shield is decreased.

3. The respirator of claim 1, further comprising a secondary inhalation pathway including at least one valve positioned on the nose piece such that air flows from the facemask zone to the breathing zone when an operator inhales.

4. The respirator of claim 1, the filter cartridge engagement structure further comprising a plurality of attachment lobes, wherein each of the plurality of attachment lobes has a different radial dimension than each of the other attachment lobes such that the filter cartridge assembly couples to the filter cartridge engagement structure in a single orientation.

5. The respirator of claim 4, wherein each of the plurality of attachment lobes has an outermost edge defining an arc length and wherein each of the plurality of attachment lobes has a different arc length than each of the other attachment lobes.

6. The respirator of claim 4, wherein the filter cartridge assembly further comprises:
- a top cover;
- a lower cover removably coupled to the top cover, the lower cover including a cooperating mating structure configured to rigidly couple to the plurality of attachment lobes; and
- a filtering system positioned between the top cover and the lower cover.

7. The respirator of claim 4, wherein the filter cartridge engagement structure includes a first attachment lobe defining a first radius, a second attachment lobe defining a second radius, and a third attachment lobe defining a third radius.

8. The respirator of claim 7, wherein the first radius is between 70% and 95% of the second radius.

9. The respirator of claim 7, wherein the second radius is between 65% and 99% of the third radius.

10. A full-mask respirator comprising:
- a shield;
- a rim encompassing the shield;
- a nose piece, the nose piece is configured to create a nose seal around a user's nose and mouth;
- a face seal, the face seal together with the rim and the shield is configured to create an outer seal on a user's face;
- an inhalation pathway, the inhalation pathway comprising:
  - a conduit comprising:
    - a first end rigidly coupled to the nose piece;
    - a second end opposing the first end and including a filter cartridge engagement structure;
    - a sidewall extending between the first end and the second end, the sidewall having an outer surface and an inner surface;
    - a channel defined by the inner surface of the sidewall, the channel extending through the conduit providing a direct pathway into the nose piece; and
    - a vent located through the sidewall at a location between the filter cartridge engagement structure and the first end of the conduit such that the vent is outside of the nose piece;
- a filter cartridge assembly configured to couple to the filter cartridge engagement structure of the conduit; and
- an exhalation pathway, the exhalation pathway comprising:
  - an exhalation conduit coupled to the nose piece; and
  - a cover coupled to an outer end of the exhalation conduit.

11. The full-mask respirator of claim 10, further comprising a secondary inhalation pathway including at least one valve positioned on the nose piece such that air flows from a space within the shield into the nose piece when the user inhales.

12. The full-mask respirator of claim 11, the filter cartridge engagement structure further comprising a plurality of attachment lobes, wherein each of the plurality of attachment lobes has an outermost edge defining an arc length and wherein each of the plurality of attachment lobes as a different arc length than each of the other attachment lobes.

13. The full-mask respirator of claim 12, wherein the filter cartridge engagement structure includes a first attachment lobe with a first arc length, a second attachment lobe with a second arc length, and a third attachment lobe with a third arc length.

14. The full-mask respirator of claim 13, wherein the third arc length is between 60% and 70% of the first arc length.

15. The full-mask respirator of claim 14, wherein the third arc length is between 75% and 85% of the second arc length.

16. The full-mask respirator of claim 10, wherein the filter cartridge assembly further comprises:

a top cover;

a lower cover removably coupled to the top cover, the lower cover including a cooperating mating structure configured to rigidly couple to the filter cartridge engagement structure; and a filtering system positioned between the top cover and the lower cover.

* * * * *